ELECTROPHOTOGRAPHIC DUPLICATOR

Original Filed Oct. 2, 1967 2 Sheets-Sheet 1

United States Patent Office

Re. 27,700
Reissued July 17, 1973

27,700
ELECTROPHOTOGRAPHIC DUPLICATOR

Shigeru Suzuki, Keiji Sugita, Yutaka Koizumi, and Tadaaki Kanno, Yokohama, Japan, assignors to Kabushiki Kaisha Ricoh, Tokyo, Japan Original No. 3,533,691, dated Oct. 13, 1970, Ser. No. 672,252, Oct. 2, 1967. Application for reissue July 13, 1971, Ser. No. 162,318
Int. Cl. C03g *15/00*
U.S. Cl. 355—13 3 Claims

Matter enclosed in heavy brackets [ ] appears in the original patent but forms no part of this reissue specification; matter printed in italics indicates the additions made by reissue.

ABSTRACT OF THE DISCLOSURE

An electrophotographic duplicator having a roll of copy paper at one end mounted in a light-impervious chamber. The copy paper is freely removed from the roll and passed into a suction chamber and fed by belts across a surface which faces a transparent supporting surface for an original to be duplicated. A continuously slidable indicator extends along the supporting table and is coupled with a cutting device and a device for feeding paper such that a given length of paper corresponding to the setting of the indicator will be fed to the belts. The adjustment of the indicator is continuous and the indicator is set to the position of the leading edge of the original to be duplicated. *The setting of the indicator governs the travel of a movable optical system between a stationary original and a stationary copy sheet and determines the operation of a cutter to sever the copy from the roll in accordance with the length of the original.*

This invention relates to an electrophotographic duplicator. The object of this invention is to provide a functionally excellent electrophotographic duplicator.

In the duplicator of this invention rolled printing paper is used. Said rolled printing paper is cut in accordance with the length of an original positioned on an original set table fixed on the top plate of the duplicator. This cut printing paper, after passing through the charging device, is stopped where it is forwarded just under said original. Hereupon, a movable exposure device shifts between said original and the printing paper and gives a latent electrostatic image onto the printing paper. At the same time exposure by said exposure device is completed, the printing paper bearing the latent electrostatic image is forwarded into a developing device and a fixing device, and finally discharged out of the machine.

The printing paper fed out of a printing paper roll is led into a cutting device after passing through a roller device for curl dekinking. The cut printing paper is slightly bent during the developing process, and in the other processes, it is shifted on a flat path. The printing paper is, therefore, shifted quite smoothly, and the unreasonable shift and the friction of printing paper seen in a turned path of a conventional automatic duplicator are totally overcome.

Said movable exposure device is changed in its moving range in accordance with the length of the cut printing paper. Namely, the slit light of said exposure device, crossing through the printing paper, is shifted from the front end of said printing paper to the rear end, and thereby gives exposure onto the printing paper. However, when said slit light reaches the rear end of the printing paper, a part of said exposure device operates a microswitch and moves back the exposure device to its initial position. This shifting range of the exposure device is determined by a device for adjusting the length of the printing paper. In this way, by changing the movable range of the exposure device in accordance with the length of the printing paper, unnecessary movements of the exposure device can be avoided and the rapid duplication operation is conducted.

In order to cut the rolled printing paper in accordance with the length of the original, a pointer which is movable along the side edge of the transparent original set table needs only to be registered with the rear end of the original. Said pointer is to be moved and positioned manually through an operating member provided for sliding at the front of the duplicator.

The duplicator of this invention has, in addition to the above-mentioned means, means to obtain a fine copy, for example, an exposure amount adjusting means for the moving exposure device and means to keep the printing paper in flat.

Figure 1:
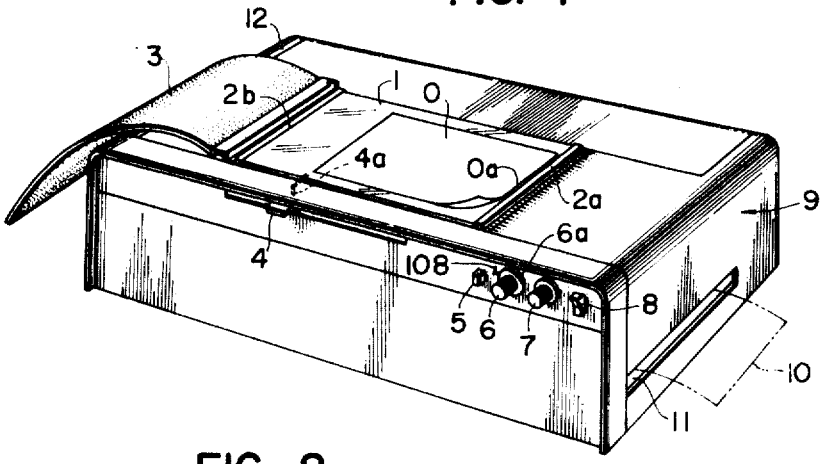

The invention is explained with reference to the drawings illustrating a preferred embodiment of this invention in which:

FIG. 1 denotes a perspective view of an electrophotographic duplicator showing a preferred embodiment of this invention.

Figure 2:
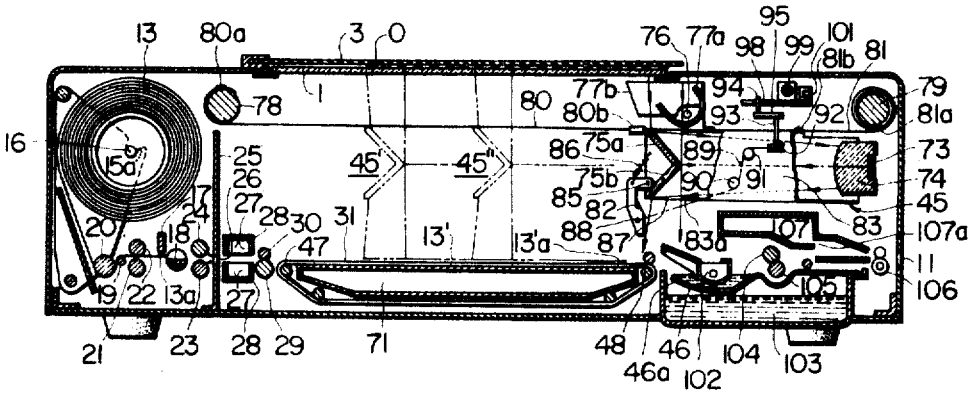

FIG. 2 denotes a sectional view of the duplicator.

Figure 3:
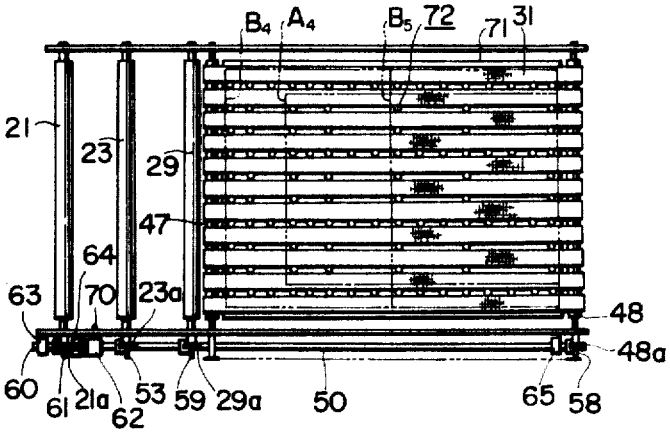

FIG. 3 denotes a plan view of a moving device for printing paper.

Figure 4:
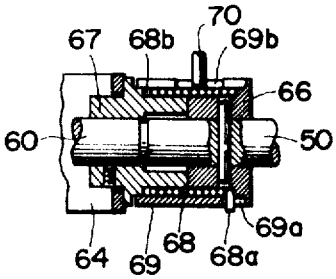

FIG. 4 denotes a sectional view of a one revolution clutch only.

Figure 5:
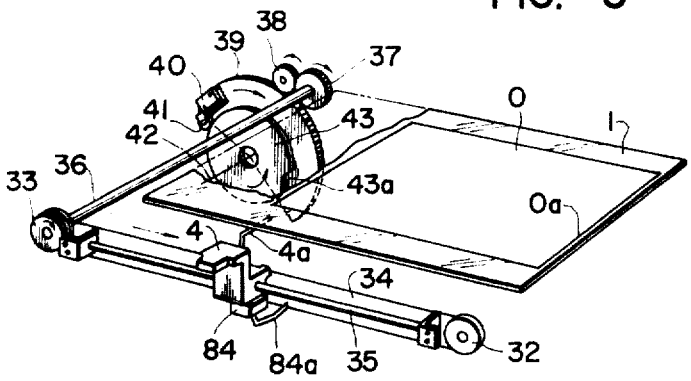

FIG. 5 denotes a perspective view showing only a positioning device to cut the printing paper fed out of a printing paper roll in any length in accordance with the length of an original.

Figure 6:
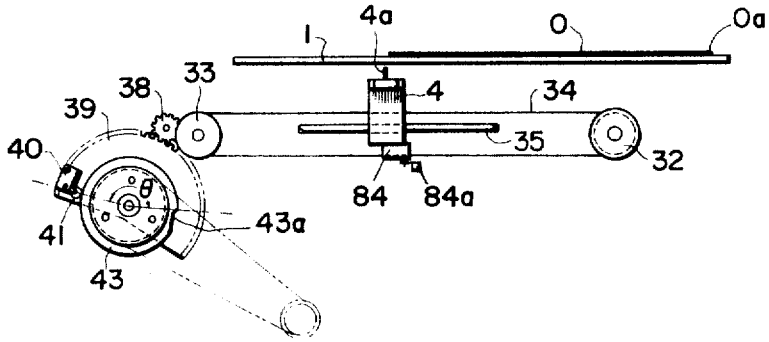

FIG. 6 denotes a front view of the device in FIG. 5.

Figure 7:
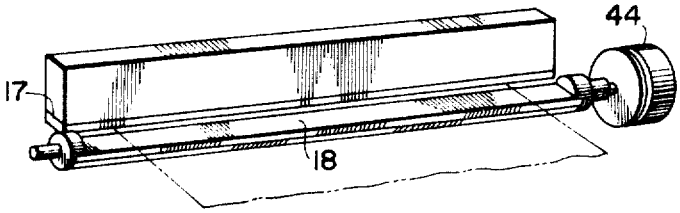

FIG. 7 denotes a perspective view of a cutting device which cooperates with said positioning device.

Figure 8:
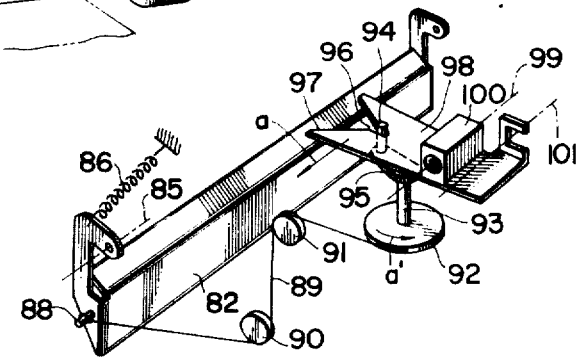

FIG. 8 denotes a perspective view indicating an exposure amount adjusting device of a slit exposure device.

Figure 9:
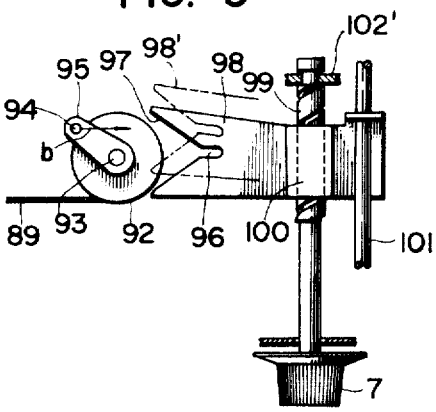

FIG. 9 denotes a plan view of a portion of the device in FIG. 8.

In FIG. 1, both the end edges of a transparent original set table 1 is fixed to the top plate of the duplicator with catching metal fittings 2a and 2b. The original 0, turned upside down, positioned on said set table 1 with the front end 0a corresponding to one metal fitting 2a is pressed against the set table 1 with a pressing plate 3 with one edge thereof pivoting to the top plate. For said pressing plate 3 is used material fit for contacting the original 0 closely with the set table 1, for example, comparatively heavy rubber plate. On the front of the duplicator housing are provided an operating member 4 for positioning the printing paper and cutting it in accordance with the length of the original, a starting button 5, a positioning dial 6 indicating the number of times to repeat the operation of the duplicator, an exposure adjusting knob 7, and an electric source switch 8. On the right side plate 9 of the duplicator housing an ejecting port 11 for the finished printing paper 10 is provided. The left side plate 12 of the duplicator housing is removably secured to the housing. By removing this side plate 12 from the housing, the rolled printing paper 13 (see FIG. 2) is loadable.

In FIG. 2, the lower portion of the roller printing paper 13 is rotatably supported by inserting a shaft 16 into the notch 15a of a frame plate 15 pivoted to a fixed member through a shaft 14. The front end 13a of the printing paper drawn out of the rolled printing paper is drawn to a cutting device comprising a fixed blade 17 and a movable blade 18. On said frame plate 15 is pivoted a printing paper pressing roller 20 in order to pressure-contact the printing paper against a roller 19 which is comparatively small in diameter. Said roller 19 dekinks the curl of the printing paper.

A pair of drawing-out rollers 21 and 22 provided on the left side of the cutting device begin to rotate when the starting button 5 (see FIG. 1) is pushed on, and stop automatically after one revolution of the roller 21. This revolution depends on the one revolution clutch to be described below. When said drawing-out roller 21 completes one revolution, an end 13a of the printing paper is caught by a pair of feeding rollers 23 and 24 rotating continuously, and is sent rightwards through a slit 26 of a partition 25. On the right side of the slit 26 is provided a pair of charging devices 28 which face each other and have wire electrodes 27 extending in the direction across the printing paper path. The printing paper, after passing through said charging devices, is ejected out onto belts 31 by rollers 29 and 30. The printing paper drawn out of the printing paper roll through said feeding rollers 23 and 24 is cut automatically to the length corresponding to that of the original 0.

FIG. 5 denotes a device to determine the time to operate the movable blade of the cutting device in order to cut the printing paper in accordance with the length of the original 0. In the figure, to the operating member 4 with a pointer 4a fixed thereto which shifts along the side edge of the original set table 1 is fixed a part of wire 34 stretched around a pair of pulleys 32 and 33. By sliding said operating member 4 along a guide bar 35 laterally, said pulley 33 is rotated. To eliminate slip between the wire 34 and the pulley 33, the both ends of the wire 34 are wound up to the pulley 33 in the opposite direction respectively, and are fastened to said pulley 33 respectively. A gear 37 is fixed to a shaft 36 of said pulley 33 and transmits the revolution to segment gear 39 through an idler 38. An actuator 41 of the microswitch 40 fixed to the inner surface of the segment gear 39 is pressure-contacted with the periphery of a one revolution disk 43 which is freely rotatable against a shaft 42 of said segment gear 39. In the course of rotation of said disk 43 in the direction of the arrow, the contact point of the microswitch 40 is closed by inserting said actuator 41 into the notch 43a of the disk 43, a rotary solenoid 44 on the movable blade 18 of the cutting device (see FIGS. 7 and 1) is excited, and by rotating the movable blade 18, in FIG. 1, about 30° in the clockwise direction, the printing paper is cut. Said disk 43 is stopped automatically after just one revolution from the position shown in FIG. 6 after said starting button 5 (see FIG. 1) is pushed on. The relative position between the notch 43a of the disk 43 and the actuator 41 of the microswitch 40 is determined by the position of the operating member 4. Now, when the operating member 4 is shifted rightwards, each of the pulley 33 and the gears is rotated in the direction shown by the arrow, the microswitch 40 is shifted in the direction approaching the notch 43a of the disk 43, and as the result, the operation time of the microswitch becomes faster so that the printing paper is cut short. Thus the angle $\theta$ (see FIG. 6) between the actuator 41 of the microswitch 40 and the notch 43a determines the operation time of the cutting device. Then, during the rotation of the disk 43 through the determined angle $\theta$, the printing paper is drawn out from the printing paper roll in the same length of the distance between the pointer 4a and the front end 0a of the original 0, and is cut.

In FIG. 2, when the front end 13a' of the printing paper 13' cut according to the length of the original and drawn out onto the belts 31 reaches the right end of said belts 31, said belts 31 having run so far is stopped, and a movable exposure device 45, at the same time, begins to move rightwards. The linear shifting distance of said belts 31 which begins to run at the same time the starting buton (see FIG. 1) is pushed on is fixed regardless of the length of the cut printing paper. That is, said belts 31 moves the length corresponding to the distance between the position where the front end 13a of the rolled printing paper 13 begins to move at the same time said starting button 5 is pushed, and the position of the front end 13a' of the cut printing paper, and is stopped automatically. Thereafter said belts 31 is moved again at the same time the exposure of the printing paper is completed, and feeds the exposed printing paper into a developing plate 46.

The peripheral speed of each of the paper feeding rollers 21, 23 and 29 is the same with the running speed of the belts 31. Each of said rollers and rollers 47 and 48 around which the belts 31 is extended is cooperated with one another. FIG. 3 denotes a plan view showing the mechanism with the above-mentioned rollers cooperated with one another. In FIG. 3, gears 23a, 29a and 48a fixed to the shafts of the rollers 23, 29 and 48 except the roller 21 respectively are engaged with gears 53, 59 and 58 fixed to the cooperating shaft 50. A gear 21a fixed to the shaft of the roller 21 is engaged with a gear 61 of a clutch shaft 60. Said cooperating shaft 50 and said clutch shaft 60 are connected with each other on one axis through the one revolution clutch 62. Reference numbers 63, 64 and 65 denote bearings. Said one revolution clutch 62, as shown in FIG. 4, comprises a cylindrical body 66 fixed to the cooperating shaft 50, a cylindrical body 67 fixed to the clutch shaft 60, a cylinder 69 loosely fitted with the cylindrical bodies 66 and 67, a spiral spring 68 which is wound up around the peripheries of said cylindrical bodies 66 and 67, one end 68a of which is mounted at a slot 69a of said cylinder 69, and the other end 68b of which is opened, and an actuator 70 which is engageable with a groove 69b of said cylinder 69. When the starting button 5 (see FIG. 1) is pushed on by an operator and the cooperating shaft 50 starts to revolve simultaneously, the actuator 70 slips out of the groove 69b so that the cylinder 69 is rotatable freely. Under this condition, when the cooperating shaft 50 rotates in the clockwise direction in facing the right side of FIG. 4, the clutch shaft 60 is integrated with the cooperating shaft 50 by the shrinkage of the spiral spring 68 and is rotated in the same direction. On the other hand, said actuator 70 is pressure-contacted against the periphery of the cylinder 69 immediately after slipping out of the groove 69b. And when the cylinder 69 has rotated one turn together with the cooperating shaft 50, said actuator 70 dashes into the groove 69b again. When the cooperating shaft 50 continues to revolve under the condition that the revolution of the cylinder 69 is prevented by the actuator 70 and one end of the spiral spring 68 is not rotatable, the clutch shaft 60 is not given the revolution owing to the loosening of the spiral spring 68. Therefore, the roller 21 which cooperates with said clutch shaft 60 is stopped, and the rollers 23, 29 and 48 cooperating with the cooperating shaft 50 continue to revolve. It has already been mentioned that said rollers 23, 29 and 48 are stopped temporarily to give exposure to the printing paper 13' (see FIG. 2).

On the top plate of a printing paper suction case 71 with a number of belts 31 contacted therewith, a number of suction holes 72 to attract the printing paper to be carried by the belts 31 to said belts 31 through the provision of the suction. The attracted printing paper is maintained in a preferable flat condition. In FIG. 3, when a chain line $B_5$ represents the paper size of Rank B, size 5, a chain line $B_4$ represents Rank B, size 5, and a chain line $A_4$ represents Rank A, size 4, respectively, some of the rows of said suction holes 72 provided in the direction to cross the belts 31 are positioned where the front and rear ends of the printing paper can be attracted without fail, and prevents the edges of the printing paper from bending.

In FIG 1, the movable exposure device 45 which gives slit exposure to the printing paper fixed on the belt 31 mainly comprises a duplicating lens 74 with a reflecting mirror 73 at the rear, reflecting mirrors 75a and 75b which are inclined at 45° to the imaginary horizontal plane including the optical axis of said lens 74 and the reflecting surfaces of which face the original 0 side and the printing paper 13' side respectively, an illumination tube 76 for illuminating said original 0, reflecting plates 77a and 77b for reflecting the light from the illumination tube 76 to the original effectively, shutters 80 and 81 with the outer edges 80b and 81b fixed to the both ends of the movable having winding-up function respectively and with the inner edges 80b and 81b fixed to the bath ends of the movable exposure device, and a slit width adjusting plate 82 for the movable exposure device. The above-mentioned elements are mounted on an optical supporting frame 83. Said supporting frame 83 is supported to the duplicator housing by a guide rail (not shown in the drawings) so as to reciprocate between the stationary original 0 and the printing paper stopped temporarily. The slit exposure is performed to the printing paper while said supporting frame 83 is moving leftwards from the position shown in the figure, and thereafter the supporting frame 83 moves back to its initial position shown in the figure. The time when said movable exposure device 45 begins to shift leftwards is the same with the time when the belts 31 is stopped when the printing paper 13' moves to the position shown in the figure. The shifting range of the movable exposure device 45 is changed in accordance with the length of the printing paper laid on the exposure position, more accurately, in accordance with the determined position of the operating member 4 (see FIG. 1) which determines the length of the printing paper to be cut. At the lower portion of said operating member 4 a microswitch 84 for switching is fixed as shown in FIG. 5. An actuator 84a of said microswitch 84 occupies [its] *a* position in the shifting path of the movable exposure device 45 [switches] *to switch* the microswitch 84 by [pushing] *engaging* a portion of said movable exposure device *while it* is moving [forth] *forward* [and moves back] *to reverse the direction of movement of* said exposure device 45. For example, in the case of the printing paper cut in Rank A size 4 the moveable exposure device is moved to the position 45', and in the case of the printing paper Rank B size 5, said exposure device is moved to the position 45''. Then said exposure device is immediately moved back from such positions. In this way, it is very advantageous for rapid duplication to give the movable exposure device 45 the minimum movement in accordance with the size of the printing paper. *The movable exposure device 45 per se is not part of our invention and is known to the art. One embodiment is shown in U.S. Pat. 3,364,816, isued to Jeffree on Jan. 23, 1968*

The slit width adjusting plate 82 pivoted at the supporting frame 83 with a shaft 85 at the neighborhood of the reflecting mirror 75b is given by a weak spring 86 rotationability around said shaft 85 in the clockwise direction, that is, in the direction to open a slit 87 between the lower edge of the reflecting mirror 75b and the edge 83a of the supporting frame 83. One end of a connecting string 89 with the other end fixed at a pin 88 provided on the slit width adjusting plate 82 is fixed to the periphery of a rotating plate 92 through guide rollers 90 and 91 pivoted on the side surface of the supporting frame 83. Said rotating plate 92 is fixed at the lower portion of the vertical shaft 93 suitably supported by said supporting frame 83, and at the upper portion of said vertical shaft 93, a swing member 95 fixed to a pin 94 is secured rigidly. Said vertical shaft 93 is given rotating force by the elasticity of the spring 86 provided on the slit width adjusting plate 82, and on the other hand, said vertical shaft 93 is given frictional force strong enough not to rotate said shaft 93 by the elasticity of said spring 86.

In FIGS. 8 and 9, at a notch 96 for determining the position where said pin 94 is inserted when the movable exposure device is set in its initial position, and at an engaging member 98 with a V-shaped guide edge 97 connected with said notch 96, a block 100 engaged with a screw rod 99 supported by the duplicator housing is fixed in perpendicular to the moving direction of said movable exposure device. By turning the adjusting knob 7 provided on the outer end of said screw rod 99, said engaging member 98 is shifted in parallel to the axis of the screw rod 99. The rotation of said engaging member 98 relative to the rod 99 is prevented by a guide bar 101 with a part of the engaging member engaged therewith. The movement of said screw rod 99 in the axial direction is prevented by a bearing 102'.

In FIG. 8, when the engaging member 98 is shifted in the direction of an arrow a, the rotating plate 92 is rotated in the direction of an arrow a' and pulls the connecting string 89. The slit width adjusting plate 82 is thereby swung in the direction to reduce the width of the slit 87 (see FIG. 2) around the shaft 85 against the elasticity of the spring 86.

The pin 94 positioned by the engaging member 98 remains in its initial position even when the movable exposure device moves, separates from the engaging member 98, and is inserted into the notch 96 of the engaging member 98 again when said movable exposure device moves back to its initial position again. Thus, when the movable exposure device is set in its initial position, the exposure amount, that is, the width of the slit can be adjusted with the adjusting knob 7 (see FIG. 1) mounted in the fixed position outside the duplicator by cooperating the swing member 95 provided in said movable exposure device and the engaging member 98 provided on the side of the duplicator housing.

The V-shaped guide edge 97 connected to the notch 96 for positioning said engaging member 98 is used for leading said pin 94 into the notch 96, regardless of the swing position of the pin 94 and the changeable adjustment position of said engaging member 98. Namely, even when the adjusting knob is rotated during the shift of the pin 94 along with the movable exposure device after separating from the notch 96, for example, as shown in FIG. 9, even when the engaging member in the position shown by a dotted line 98' is shifted to the position shown by a full line in said figure while said pin 94 is moving, the pin 94 which moves back in the direction shown by an arrow *b* is led into the notch 96 by the guide edge 97.

As the movable exposure device is shifted inside the duplicator housing, it is required to provide a hole long enough to cover the shift range of said movable exposure device in order to expose out the operating member which gives movement to the slit width adjusting plate provided at said movable exposure device. On the other hand, in the exposure adjusting device constructed as mentioned above, the hole is not necessary and when the movable exposure device is in the initial position, the slit width of said movable exposure device is easily adjusted with the adjusting knob provided at the fixed position outside the duplicator by providing on the side of the duplicator housing the engaging member which cooperates with the swing member on the movable exposure device. Further, when the movable exposure device moves back to the initial position, the V-shaped guide edge which leads said swing member 95 to the fixed position of the engaging member 98 is provided at said engaging member 98, regardless of the swing position of the swing member 95 and the changeable adjustment position of the engaging member 98, so that no troubles may be occurred between the exposure amount adjusting mechanism on the movable exposure device and the adjusting mechanism on the side of the duplicator housing, even if the adjusting knob is rotated by mistake, or even if said adjusting knob is operated as the next step of the exposure adjustment for exposure, while the movable exposure device is shifting.

In FIG. 2, at the same time the movable exposure device 45 is moved back to the initial position after one reciprocation simultaneously, the belts 31 which has remained stationary so far begins to move and feeds the printing paper 13' having been exposed and bearing a latent electrostatic image onto the developing plate 46. The developer injection tank 102 provided in the upper portion of the developing plate 46 is connected to a comparatively large developer tank 103. The developer within said developer tank 103 is poured continuously into said developer injection tank 102 by a pump (not shown in the figures), and the developer poured into the injection tank 102 flows into said developing plate 46 through holes provided side by side on the side wall of said injection tank 102. Then, the developer overflowed out of the rear end 46a of the developing plate 46 flows back into the developer tank 103 again.

The printing paper which has passed through the developing plate 46, wherein the development is completed and a visual image is obtained with toner is forwarded towards an ejection roller 106, passing between a hard roller 104 and a rubber roller 105. The wet printing paper forwarded out by said rollers 104 and 105 is dried by air blown out of a ventilation opening 107a, and is forwarded out of the duplicator through the ejecting port 11 by means of said ejection roller 106. As the air to be forcibly discharged out of a ventilation device 107, air blown out of the paper suction case 71 by a suitable blower and air for cooling the lighting lamp 76 are used effectively.

In FIG. 1, the dial 6 is provided for determining the number of times of a series of duplicating actions mentioned above to be repeated automatically. For instance, when the starting button 5 is pushed on after the number "10" on the scale 6a integral with the dial 6 is registered to a stationary index 108, the duplicating operations are repeated for ten times and ten copies are obtained for one original. As to counting means to construct said operation repeating device, various means are proposed and known publicly. However, the duplicator of this invention is adopted a mechanical counting means along with a microswitch, and comprises a stopper to determine the position corresponding to the number of times of the actions by means of the dial 6, a rotationable notched disk the initial position of which is determined by said stopper, a ratchet means to revolve said disk from said initial position against the rotation habit of the disk, and an operating plate the engaging member of which is pressure-contacted with the disk on the rotation path of the notch of said notched disk, thereby prevent said disk from rotating by the rotation habit and which enables to release the pressure contact of said engaging member with the disk by means of the starting button 5. When said engaging member is engaged with said notch, the microswitch for stopping the operation is operated by the engagement with said member, and the microswitch for starting the action is operated by releasing the engagement between said engaging member and said notch through the starting button 5. The above mentioned device has been filed entitled "Action Repeating Device" as Japanese patent application No. 67022/1966 by the present applicant on Oct. 12, 1966.

The electrophotographic duplicator, as described above, comprises a device to cut loaded rolled printing paper in any size in accordance with the length of an original, a charging device to charge the printing paper, a belt conveyor which carries the cut printing paper in a flat condition through the vacuum action of a paper suction case and which stops automatically when said printing paper is positioned at the predetermined exposure position, a developing device housing developer which circulates for obtaining clear toner images at all times, a blower device for drying the wet developed printing paper, a transparent original set table with a pressing plate fixed to the upper portion of said belt conveyor, a movable exposure device the shifting range of which between said original set table and said belt conveyor is changed in accordance with the cut printing paper and which reciprocates at the minimum range effective for the exposure so as to speed up the duplicating operation, device for adjusting the exact exposure amount through the operation of said movable exposure device from outside, and in said duplicator the printing paper path from the printing paper cutting device to the printing paper ejecting port is to facilitate the shift of the printing paper arranged in an imaginary plane.

What is claimed is:

[1. An electrophotographic duplicator comprising an optical unit with a mirror positioned vertically at the back of an image focusing lens, two mirrors arranged above and below the optical axis of said lens with an inclination of about 45° and a support on which said lens and said mirrors are mounted, a supporting table of a transparent material covered with a plate for the support of an original to be duplicated, a sheet transfer table including belts mounted on pairs of rollers at the circumference of a printing paper suction case with a large upper square surface facing the supporting table, a device for cutting photosensitive paper to length, an indicator which is movable along a side edge of said transparent supporting table coupled to the cutting device to control the length of paper which is cut, a light impervious chamber in which a roll of copy paper is housed for mounting and free removal, a liquid developing device in which developer liquid is continuously agitated to keep a constant density, a drying device, and a charging device, said charging device, said sheet feed table and said developing device being arranged approximately in a line in the lower part of the duplicator, said original supporting table being arranged in the upper part face to face with said sheet feed table and said optical unit being arranged to move parallel between said tables.]

[2. A duplicator as claimed in claim 1 comprising feed means for withdrawing paper from said roll of copy paper, and means connecting said indicator with said feed means and said cutting device to feed of paper from said roll of copy paper and cause a length thereof to be cut dependent upon the position of the indicator.]

[3. A duplicator as claimed in claim 2 wherein said indicator is continuously slidable along said table and the length of paper cut is continuously adjustable by moving the indicator.]

[4. A duplicator as claimed in claim 1 wherein said cutting device comprises a rotary member which begins to rotate from a predetermined position in union with a roller for feeding rolled printing paper and stops automatically after one revolution, a swing member which is mounted coaxially with said rotary member, and is presettable by hand in a position corresponding to the size of the printing paper to be cut, a switch which operates when said rotary member and said swing member take their respective definite relative positions, a movable blade and a driving means for said movable blade which operates simultaneously with the operation of said switch.]

*5. In a machine for making a copy of an original on a length of copy material, apparatus including a first stationary means for supporting an original to be copied at a first location during a copying operation, a second stationary means for supporting a length of copy material at a second location spaced from and positioned in face-to-face relationship to said original during a copying operation, an optical system for projecting an image of said original onto said copy material, means mounting said optical system for movement along a path between said first and second supporting means, drive means for said optical system, a supply of an extended length of said copy material, means for feeding material from said supply to said copy material supporting means, actuatable means for cutting a length of material fed from said supply to said copy material supporting means, positionable means mounted for movement adjacent said original supporting means for gauging the length of an original, first means responsive to the position of said gauging means for controlling said drive means to determine the length of the path of movement of said optical system,*

*and second means responsive to the position of said gauging means for actuating said cutting means to cut a length of copy material fed by said feeding means to the length of said original.*

*6. In a machine for making a copy of an original on a length of copy material, apparatus including first stationary means for supporting an original to be copied at a first location during a copying operation, a second stationary means for supporting a length of copy material at a second location spaced from and positioned in face-to-face relationship to said original during a copying operation, an optical system for projecting an image of said original onto said copy material, means mounting said optical system for movement along a path between said first and second supporting means, drive means for said optical system, positionable means mounted for movement adjacent said original supporting means for gauging the length of an original, and means responsive to the position of said gauging means for controlling said drive means to determine the length of said path of movement of said optical system.*

*7. An electrophotographic duplicator including in combination, a supporting table of a transparent material covered with a plate for the support of an original to be duplicated, a copy paper suction case forming a sheet transfer table, means mounting said original supporting table in the upper part of said duplicator face to face with said sheet transfer table, belts extending over said sheet transfer table, rollers for supporting said belts, an optical unit mounted for movement parallel to and between said tables for translating an image of an original on said supporting table to a length of copy paper on said transfer table, said optical unit comprising a mirror positioned vertically at the back of an image focusing lens, two mirrors arranged above and below the optical axis of said lens with an inclination of about 45°, a source of illumination for illuminating said original, and a support on which said lens and mirrors are mounted, a light impervious chamber, a roll of photosensitive copy paper, means removably supporting said roll in said chamber, means for advancing copy paper from said roll to said sheet transfer table, means for charging copy paper fed from said roll to said transfer table, means for cutting paper fed from said roll to said transfer table, a liquid developing device for developing a latent electrostatic image on copy paper fed thereto, a drying device for drying copy paper fed thereto, means mounting said charging device and said transfer table and said developing device in a line in the lower part of said duplicator, means including said belts for feeding a sheet from said feed table to said developing and drying devices, an indicator movable along a side edge of said supporting table, said cutting means comprising a rotary member which begins to rotate from a predetermined position in union with a roller for feeding rolled printing paper and stops automatically after one revolution, a swing member which is mounted coaxially with said rotary member, a switch which operates when said rotary member and said swing member take their respective definite relative positions, a movable blade and a driving means for said movable blade which operates simultaneously with the operation of said switch, and means responsive to manual movement of said indicator for setting said swing member to a position corresponding to the size of the copy paper to be cut.*

References Cited

The following references, cited by the Examiner, are of record in the patented file of this patent or the original patent.

UNITED STATES PATENTS

| | | | |
|---|---|---|---|
| 3,451,752 | 6/1969 | Frank | 355—8 |
| 3,382,764 | 5/1968 | Chen | 355—28 |
| 3,416,860 | 12/1968 | Mihojevich et al. | 355—11 X |
| 3,364,816 | 1/1968 | Jeffree | 355—51 |
| 3,472,590 | 10/1969 | Fairbanks et al. | 355—28 |
| 3,401,613 | 9/1968 | Davis | 355—13 |
| 3,418,046 | 12/1968 | Hansen | 355—13 |
| 3,418,047 | 12/1968 | Lee | 355—13 |

ROBERT P. GREINER, Primary Examiner

U.S. Cl. X.R.

355—8, 28, 66